US007123879B2

(12) United States Patent
Koketsu et al.

(10) Patent No.: US 7,123,879 B2
(45) Date of Patent: Oct. 17, 2006

(54) TOLL CHARGING SYSTEM AND TOLL CHARGING METHOD

(75) Inventors: Yoshihiro Koketsu, Hyogo-ken (JP); Tetsuya Tomonaka, Hyogo-ken (JP); Tomokazu Shimoda, Hyogo-ken (JP); Ryosuke Okamoto, Hyogo-ken (JP); Yasuo Yoshikawa, Osaka (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 383 days.

(21) Appl. No.: 10/285,684

(22) Filed: Nov. 1, 2002

(65) Prior Publication Data

US 2003/0105662 A1 Jun. 5, 2003

(30) Foreign Application Priority Data

Nov. 8, 2001 (JP) ............................ 2001-343190

(51) Int. Cl.
*H04B 7/00* (2006.01)
*H04M 11/00* (2006.01)
*H04Q 7/20* (2006.01)
*G08G 1/00* (2006.01)
*G08G 1/017* (2006.01)

(52) U.S. Cl. .................... 455/41.2; 455/405; 455/406; 455/456.3; 455/456.6; 340/928; 340/933; 340/937

(58) Field of Classification Search ............... 455/41.2, 455/456.3, 456.1, 406, 405, 456.6; 340/928, 340/933, 937
See application file for complete search history.

(56) References Cited

U.S. PATENT DOCUMENTS 6,140,941 A * 10/2000 Dwyer et al. ............... 340/928
6,390,365 B1 * 5/2002 Karasawa .................. 235/384
6,396,418 B1 * 5/2002 Naito ......................... 340/928
6,816,707 B1 * 11/2004 Barker et al. ............. 455/41.2
2002/0067291 A1 * 6/2002 Ikeda ......................... 340/928

FOREIGN PATENT DOCUMENTS

EP 0 689 169 A2 12/1995
JP 9-190554 7/1997
JP 11-7562 1/1999
JP 2001-52218 2/2001

(Continued)

OTHER PUBLICATIONS

Korean Patent Office Action for corresponding Korean Patent Application No. 10-2002-67460 dated Feb. 21, 2005 with translation.

*Primary Examiner*—George Eng
*Assistant Examiner*—Un C. Cho
(74) *Attorney, Agent, or Firm*—Armstrong, Kratz, Quintos, Hanson & Brooks, LLP

(57) ABSTRACT

A toll charging system of this invention is implemented by a roadside apparatus, onboard device, portable telephone, and charging apparatus. The roadside apparatus is to detect a vehicle entering a charging area and transmit charging information to the vehicle. An onboard device and portable telephone are arranged in the vehicle. The charging information transmitted from the roadside apparatus is received by the onboard device. The onboard device generates vehicle identification information and outputs to the portable telephone instruction information instructing to transmit the charging information and vehicle identification information. On the instruction information, the portable telephone transmits the charging information and vehicle identification information. The charging apparatus receives the charging information and vehicle identification information, identifies the vehicle on the vehicle identification information, and executes charge processing for the vehicle.

7 Claims, 10 Drawing Sheets

FOREIGN PATENT DOCUMENTS

| | | |
|---|---|---|
| WO | WO 95/21424 | 8/1995 |
| WO | WO 00/45343 | 8/2000 |
| WO | WO 01/59711 | 8/2001 |

* cited by examiner

TOLL CHARGING SYSTEM AND TOLL CHARGING METHOD

CROSS-REFERENCE TO RELATED APPLICATIONS

This application is based upon and claims the benefit of priority from the prior Japanese Patent Application No. 2001-343190, filed Nov. 8, 2001, the entire contents of which are incorporated herein by reference.

BACKGROUND OF THE INVENTION

1. Field of the Invention

The present invention relates to a toll charging system and toll charging method and, more particularly, to a toll charging system and toll charging method, which automatically charge a toll for a toll road or the like as a vehicle passes through the road.

2. Description of the Related Art

To automatically charge a vehicle a toll, a method has conventionally been employed in which an onboard device is mounted on a vehicle, a credit card is inserted into the onboard device, and a toll rate corresponding to a toll is paid from the credit card on the basis of communication with a roadside system at a tollgate.

For such a toll charging method, however, a dedicated roadside infrastructure is necessary. In addition, a driver must purchase an expensive onboard device. For these reasons, this system is not rapidly proliferating.

A toll charging system which requires no onboard device and uses only a portable telephone has been developed.

However, only with a portable telephone, the charging side cannot measure the accurate position of a vehicle. Hence, this toll charging system does not work well. In addition, since a vehicle model cannot be specified, the system cannot accurately charge a toll that changes depending on the vehicle model.

For position measurement, when a GPS receiver is added, the position accuracy can be increased to some extent. However, position data measured by a GPS receiver may be altered.

Additionally, in such a toll charging system using only a portable telephone, charging is done when the driver side calls the charging side using a portable telephone. However, a driver cannot make a call by himself using a portable telephone during driving, as a matter of course. To do this, a dedicated device for making a call using a portable telephone is required.

As described above, a toll charging system that requires an expensive onboard device cannot quickly proliferate. On the other hand, a toll charging system using only a portable telephone is not practical.

BRIEF SUMMARY OF THE INVENTION

The present invention has been made in consideration of the above situation, and has as its object to provide a toll charging system and toll charging method, which can execute toll charge processing by using a portable telephone and an onboard device having a dialing function of dialing the portable telephone and automatically transmitting necessary information from the portable telephone to the charge processing side, thereby improving the reliability of the entire system while reducing the cost of the onboard device.

In order to achieve the above object, the present invention uses the following means.

A toll charging system using a toll charging method according to an aspect of the present invention is implemented by a roadside apparatus, onboard device, portable telephone, and charging apparatus.

The roadside apparatus is arranged on a roadside of a charging area to detect a vehicle entering the charging area. The roadside apparatus transmits charging information containing at least toll information and the address of a charge processing side to the detected vehicle.

An onboard device is arranged in the vehicle. The charging information transmitted from the roadside apparatus is received by the onboard device. The onboard device generates vehicle identification information to identify the vehicle and also outputs instruction information which instructs to transmit the charging information and vehicle identification information to the address contained in the received charging information. The onboard device executes communication in a shorter range than that of the portable telephone.

The instruction information output from the onboard device is input to the portable telephone connected to the onboard device. On the basis of this instruction information, the portable telephone transmits the charging information and vehicle identification information to the address. When a charge processing result is transmitted from the charging apparatus, the charge processing result is received by the portable telephone and displayed and output as voice data.

The charging apparatus receives the charging information and vehicle identification information transmitted from the portable telephone, identifies the vehicle on the basis of the received vehicle identification information, and executes charge processing for the identified vehicle. In addition, the charging apparatus transmits a charge processing result to the portable telephone of a corresponding vehicle.

Additional objects and advantages of the present invention will be set forth in the description which follows, and in part will be obvious from the description, or may be learned by practice of the present invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

DETAILED DESCRIPTION OF THE INVENTION

The embodiments of the present invention will be described below with reference to the accompanying drawing.

(First Embodiment)

The first embodiment of the present invention will be described with reference to FIGS. 1 to 9.

Figure 1:
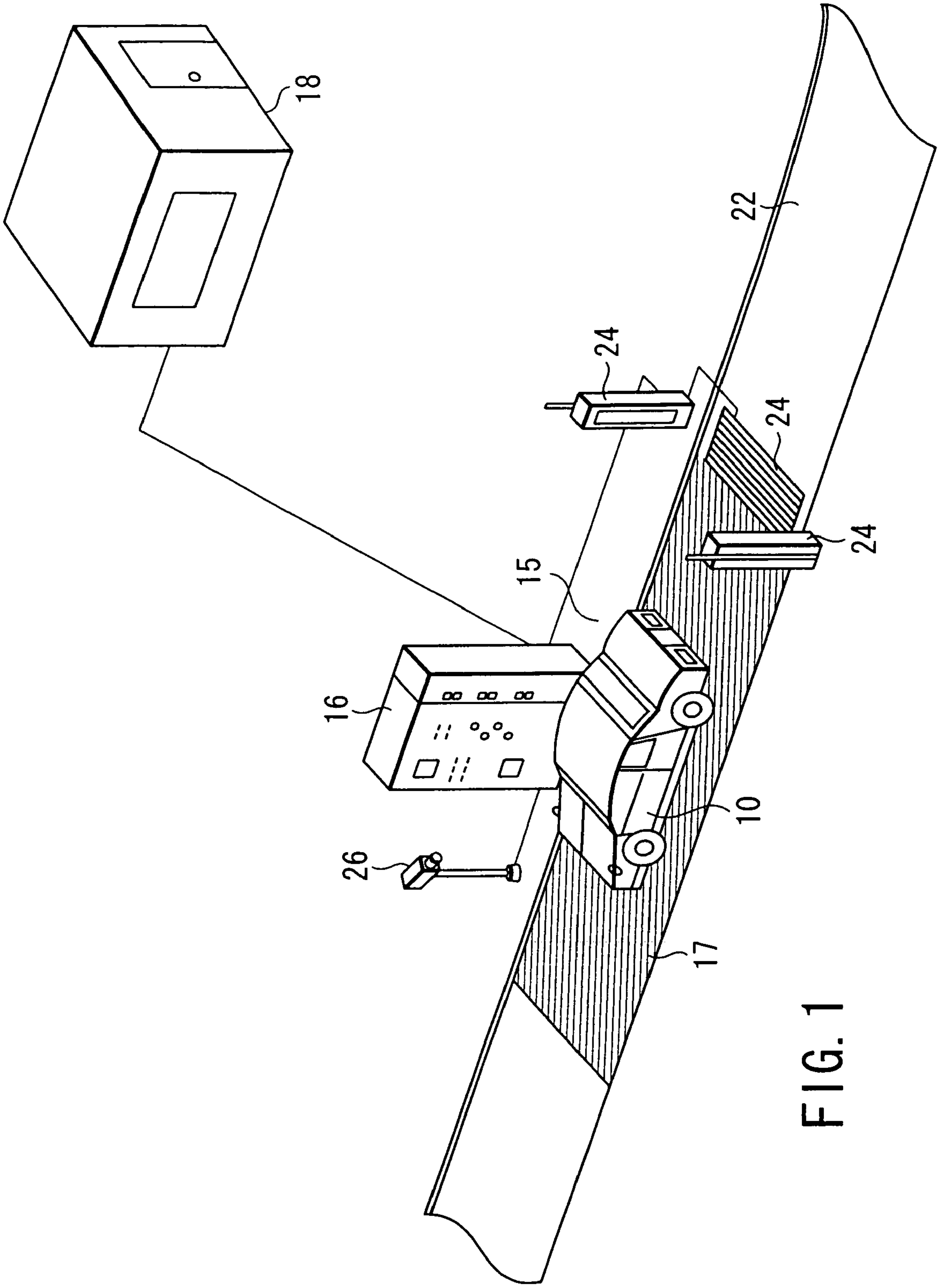
FIG. 1 is a view showing an example of the arrangement of a toll charging system using a toll charging method according to the first embodiment.
Figure 2:
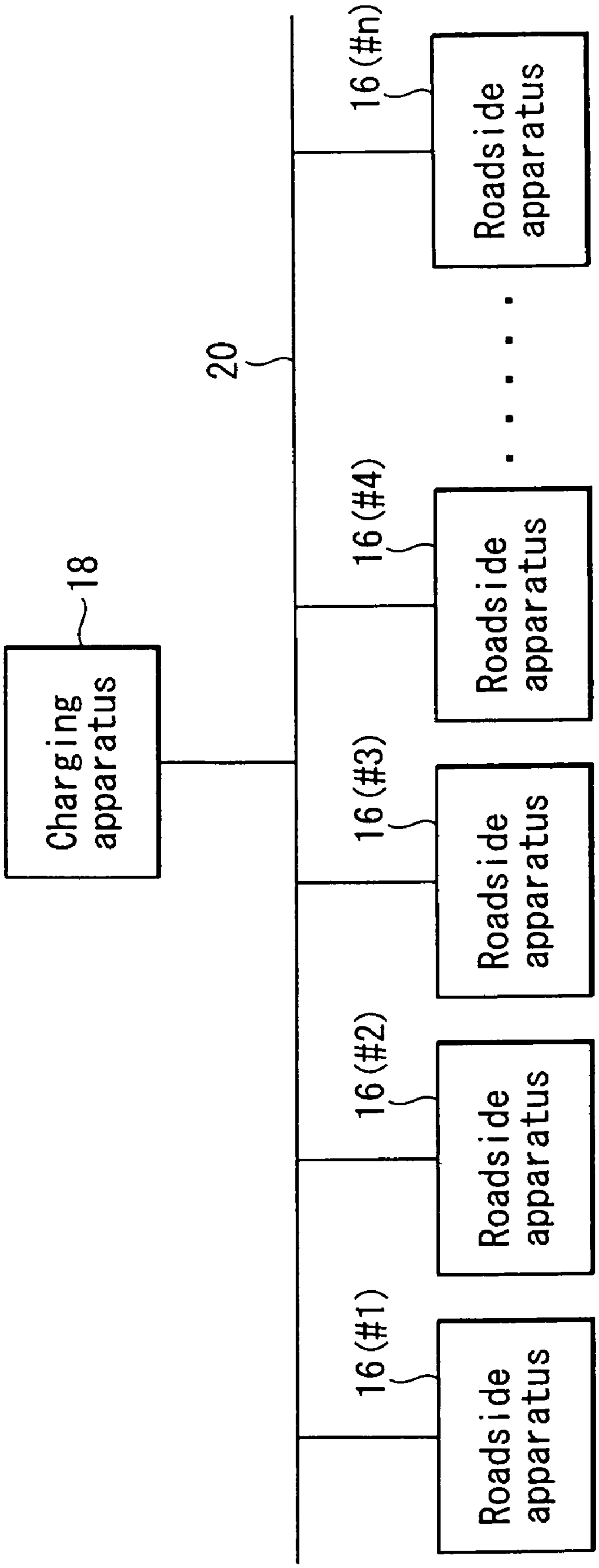
FIG. 2 is a block diagram showing a network so as to explain a connection example between a charging apparatus and roadside apparatuses.
Figure 3:
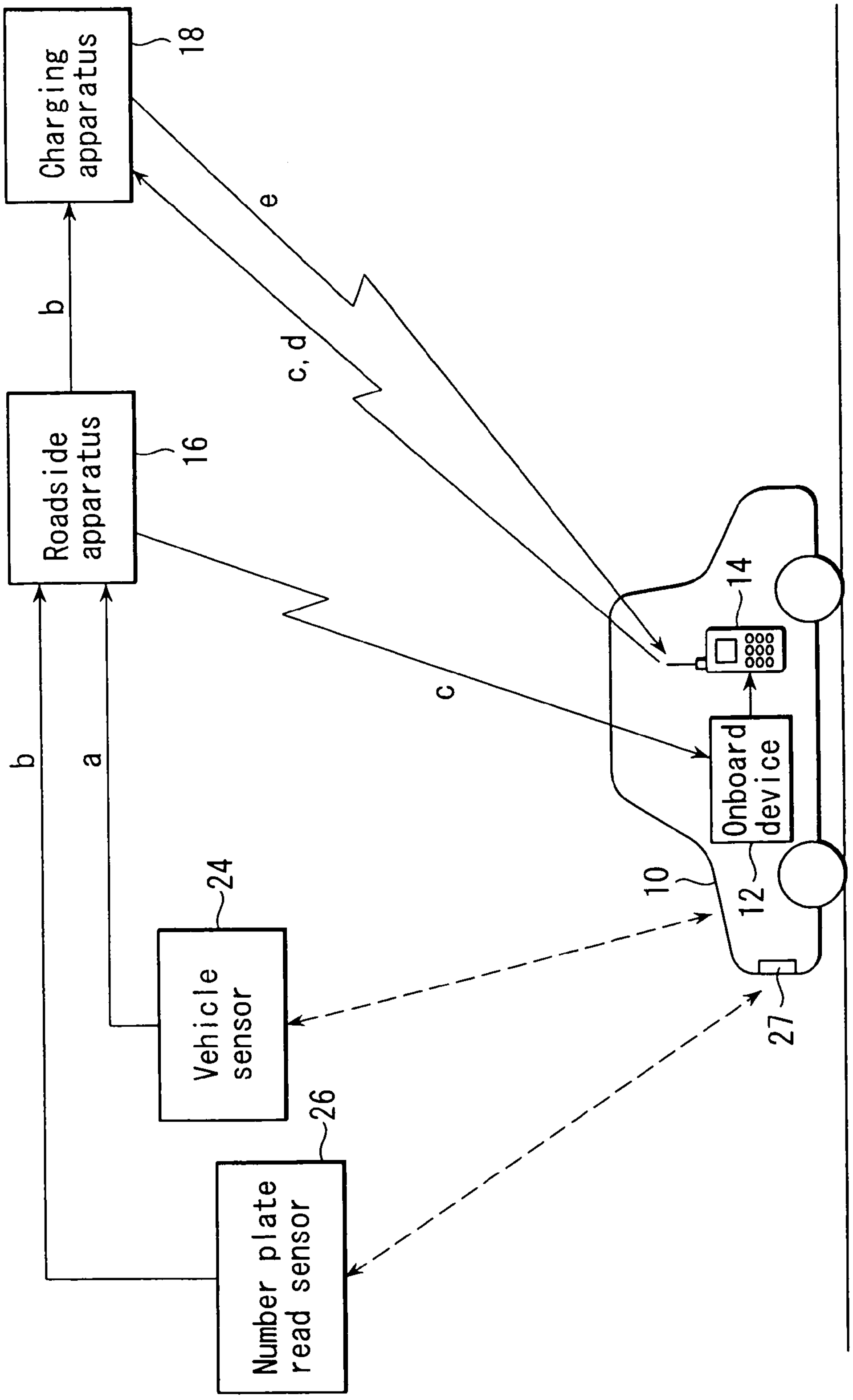
FIG. 3 is a view showing an example of a data flow so as to explain the operation of the toll charging system using the toll charging method according to the first embodiment.

As shown in FIG. 1 to FIG. 3, the toll charging system using the toll charging method according to the first embodiment comprises an onboard device 12 mounted on a vehicle 10, a portable telephone 14, a roadside apparatus 16 arranged on a roadside 15, and a charging apparatus 18.

As shown in FIG. 2, the charging apparatus 18 is connected to the plurality of roadside apparatuses 16 through a dedicated line 20. The charging apparatus 18 collectively executes charge processing in a plurality of charging areas 17 by transmitting/receiving data to/from the roadside apparatuses 16.

A vehicle sensor 24 for detecting the vehicle 10 and a number plate read sensor 26 for reading a registration number on a number plate 27 of the vehicle 10 are arranged in the charging area 17 of a toll road 22.

As the vehicle sensor 24, for example, a camera, VPD, laser VPD, footboard, or loop coil is used. As the number plate read sensor 26, for example, a camera, an electronic number plate (radio vehicle tag) reader, or the like is used.

When the vehicle 10 enters the charging area 17, the vehicle sensor 24 detects the vehicle 10 and outputs a detection signal a to the roadside apparatus 16, as shown in FIG. 3. In addition, the number plate read sensor 26 recognizes the number plate 27 of the vehicle 10 and outputs recognition information b to the roadside apparatus 16.

Upon receiving the detection signal a and recognition information b, the roadside apparatus 16 generates charging information on the basis of the recognition information b. Furthermore, the address (telephone number) of the charging apparatus 18 is added to the charging information, and the information is encrypted, thereby generating charge request information c. The encrypted charge request information c is transmitted to the onboard device 12 in the vehicle 10 by short range communication. Examples of the short range communication methods are DSRC (Dedicated Short Range Communication), optical beacon, radio beacon, and Bluetooth.

Figure 4:
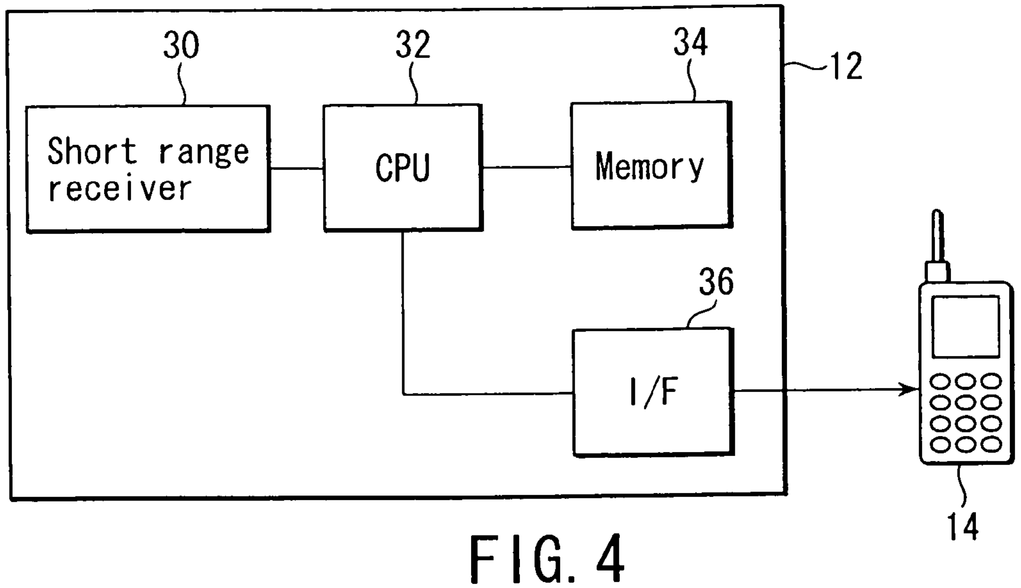
FIG. 4 is a functional block diagram showing an example of the arrangement of an onboard device.

As shown in FIG. 4, the onboard device 12 comprises a short range receiver 30, CPU 32, memory 34, and interface (I/F) 36.

The short range receiver 30 receives the charge request information c transmitted from the roadside apparatus 16 and transfers the received charge request information c to the CPU 32. In the onboard device 12 and portable telephone 14, the charge request information c transmitted from the roadside apparatus 16 is not decrypted.

The CPU 32 determines on the basis of the charge request information c transferred from the short range receiver 30 whether the charge request from the roadside apparatus 16 should be refused or agreed to. The request is refused, e.g., when the charge amount is not correct (when a midsize car is billed a charge amount for a large car).

If the charge request information c has no inconsistency, the charge request information c is agreed to and stored in the memory 34. In addition, a unique vehicle number assigned to the onboard device 12 in advance is encrypted to generate vehicle identification information d. The I/F 36 is caused to call the charging apparatus 18 represented by the address (telephone number) contained in the charge request information c to request settlement.

The I/F 36 causes the portable telephone 14 to dial the address of the charging apparatus 18 on the basis of an instruction from the CPU 32.

The portable telephone 14 is dialed by the I/F 36. When the address of the charging apparatus 18 is dialed, the charge request information c and vehicle identification information d are transmitted to the charging apparatus 18 using wide range communication. Since the vehicle identification information d is encrypted, a third party cannot recognize or alter the vehicle number. A charge processing result e transmitted from the charging apparatus 18 is received and output as character data or voice data.

For example, the onboard device 12 and portable telephone 14 are connected in the following way. However, any other connection method may be used.

Figures 5A, 5B, 5C, 5D, 5E:
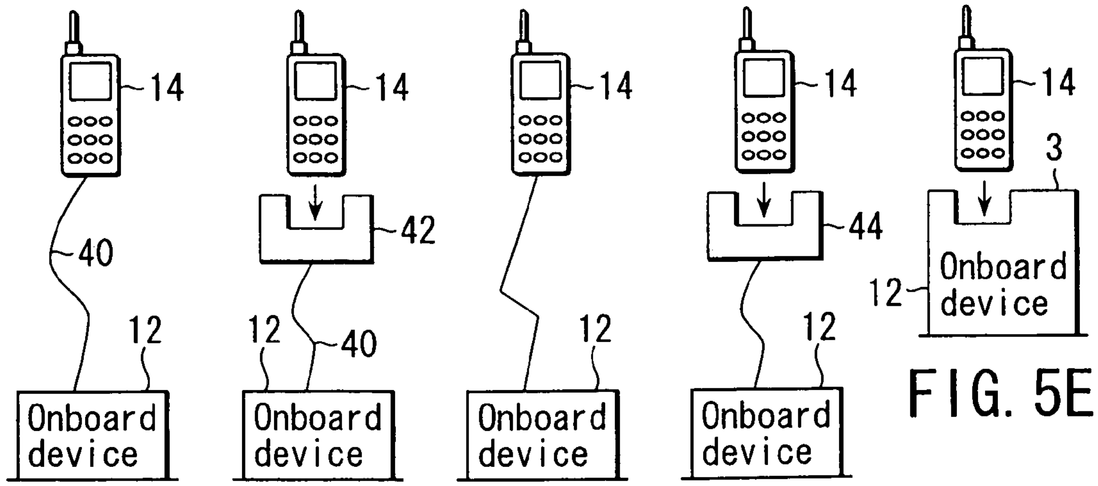
FIG. 5A is a view showing an example in which the onboard device is connected to a portable telephone through a cable.
FIG. 5B is a view showing another example in which the onboard device is connected to a portable telephone through a cable.
FIG. 5C is a view showing an example in which the onboard device is wirelessly connected to a portable telephone.
FIG. 5D is a view showing another example in which the onboard device is wirelessly connected to a portable telephone.
FIG. 5E is a view showing an example in which the onboard device is directly connected to a portable telephone.

As the first example, the onboard device 12 and portable telephone 14 are connected through a cable 40 such as a PDC cable or USB cable, as shown in FIG. 5A or 5B. FIG. 5A shows an example in which the onboard device 12 is directly connected to the portable telephone 14 using the cable 40. FIG. 5B shows an example in which the onboard device 12 and portable telephone 14 are connected by connecting the portable telephone 14 to a connector 42 connected to the onboard device 12 through the cable 40.

As the second example, a wireless system such as a Bluetooth or infrared system is used, as shown in FIG. 5C or 5D. FIG. 5C shows an example in which the onboard device 12 can communicate with the portable telephone 14 by radio. FIG. 5D shows an example in which the onboard device 12 can communicate with the portable telephone 14 by radio by attaching the portable telephone 14 to a connector 44 radio-communicable with the onboard device 12.

As the third example, the onboard device 12 and portable telephone 14 are connected by directly attaching the portable telephone 14 to the onboard device 12, as shown in FIG. 5E.

Figure 6:
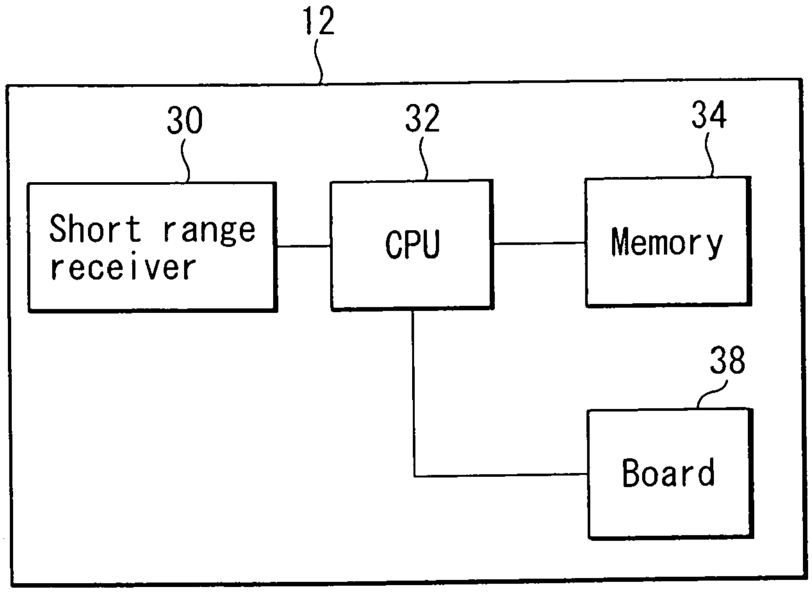
FIG. 6 is a functional block diagram showing an example of an arrangement in which a board having a portable telephone function is incorporated in the onboard device.

Alternatively, as shown in FIG. 6, a board 38 having the function of the portable telephone 14 may be incorporated in the onboard device 12 to omit the portable telephone 14.

Figure 7:
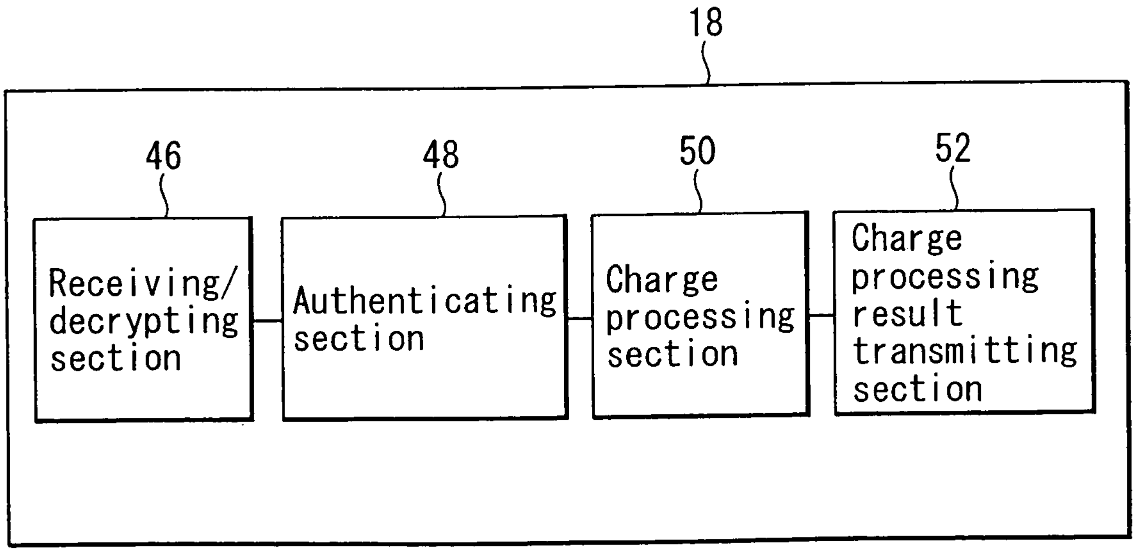
FIG. 7 is a functional block diagram showing an example of the arrangement of the charging apparatus.

As shown in the functional block diagram of FIG. 7, the charging apparatus 18 comprises a receiving/decrypting section 46, authenticating section 48, charge processing section 50, and charge processing result transmitting section 52.

The receiving/decrypting section 46 receives and decrypts the charge request information c and vehicle identification information d transmitted from the portable telephone 14 in the vehicle 10 and outputs the decryption results to the authenticating section 48. The receiving/decrypting section 46 also acquires from the roadside apparatus 16 the recognition information b output from the number plate read sensor 26 to the roadside apparatus 16 and outputs the recognition information b to the authenticating section 48.

The authenticating section 48 recognizes the vehicle on the basis of the decryption result output from the receiving/decrypting section 46 and compares the decryption result with the recognition information b output from the receiving/decrypting section 46. When the recognized vehicle is consistent with the contents of the identification information b, the authenticating section 48 outputs the decryption result to the charge processing section 50.

The charge processing section 50 executes charge processing for the vehicle 10 on the basis of the decryption result output from the authenticating section 48 and outputs the charge processing result e to the charge processing result transmitting section 52.

The charge processing result transmitting section 52 returns the charge processing result e output from the charge processing section 50 to the vehicle 10 as the transmission source of the charge request information c and vehicle identification information d using wide range communication.

Figure 8:
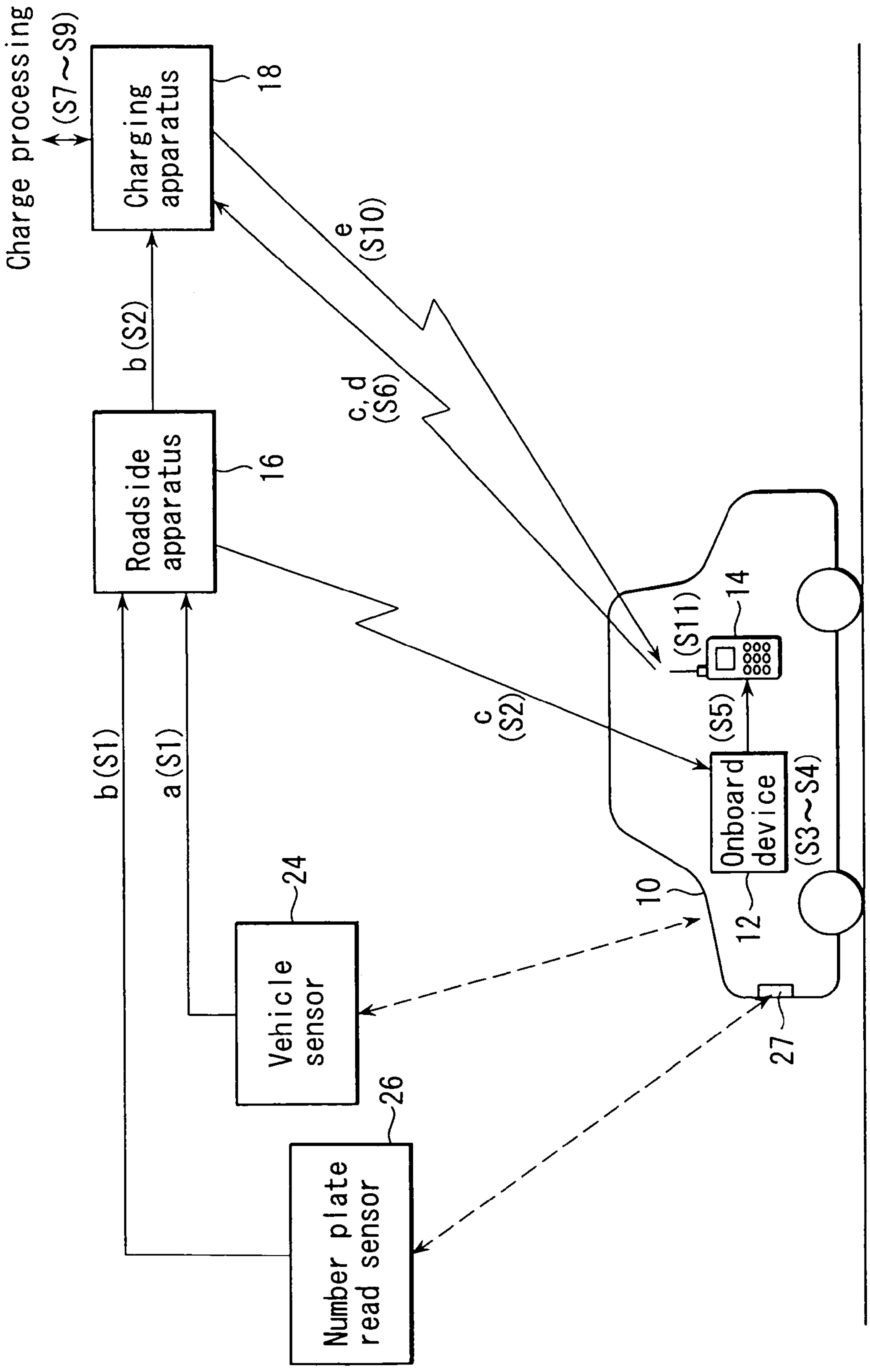
FIG. 8 is a view showing an example of a data flow so as to explain the operation of the toll charging system using the toll charging method according to the first embodiment.
Figure 9:
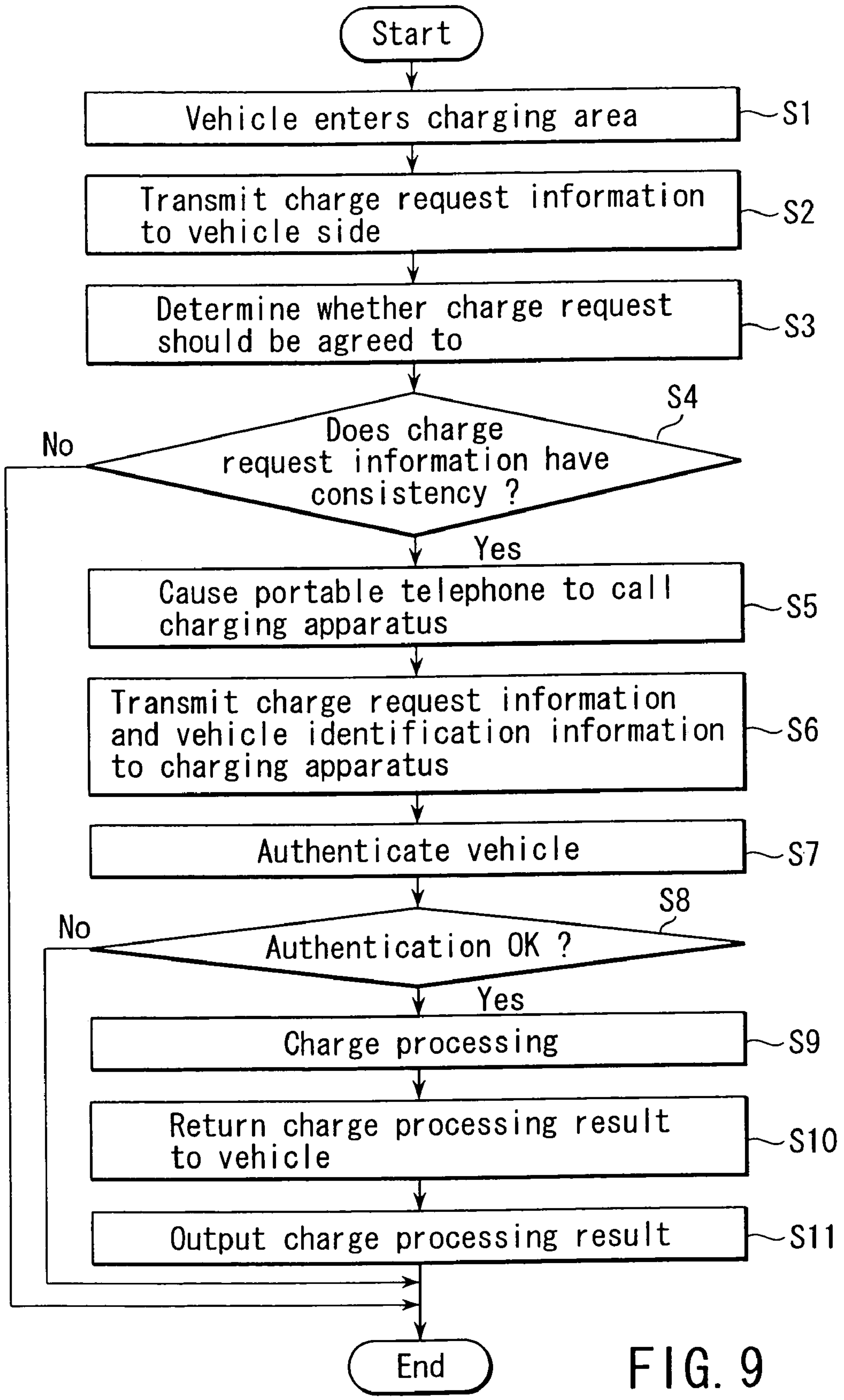
FIG. 9 is a flow chart showing an example of the operation of the toll charging system using the toll charging method according to the first embodiment.

The operation of the toll charging system using the toll charging method according to this embodiment having the above arrangement will be described next with reference to the view of a data flow shown in FIG. 8 and the flow chart shown in FIG. 9.

When the vehicle 10 that is running through the toll road 22 enters the charging area 17, the vehicle sensor 24 detects the vehicle 10 and outputs the detection signal a to the roadside apparatus 16. In addition, the number plate read sensor 26 recognizes the number plate 27 and outputs the recognition information b to the roadside apparatus 16 (step S1).

Upon receiving the detection signal a and recognition information b, the roadside apparatus 16 generates charging information on the basis of the recognition information b. The roadside apparatus 16 also adds the address (telephone number) of the charging apparatus 18 to the charging information and encrypts the information, thereby generating the charge request information c. The charge request information c is transmitted to the onboard device 12 in the vehicle 10 by short range communication. In addition, the recognition information b is output to the charging apparatus 18 (step S2).

The transmitted charge request information c is received by the short range receiver 30 in the onboard device 12 and transferred to the CPU 32. The CPU 32 determines on the basis of the charge request information c transferred from the short range receiver 30 whether the charge request should be refused or agreed to (step S3).

The request is refused (NO in step S4), e.g., when a midsize car is billed a charge amount for a large car, and the charge amount is not correct. In this case, charge processing using the toll charging system using the toll charging method according to this embodiment is not performed. Toll collection is done by directly paying the toll to a toll collector in a manned tollbooth, as usual.

If the charge request information c has no inconsistency (YES in step S4), the charge request information c is agreed to and stored in the memory 34. In addition, the vehicle identification information d is generated by encrypting the vehicle number unique to the onboard device 12.

The I/F 36 causes the portable telephone 14 to dial the address (telephone number) contained in the charge request information c (step S5). The charge request information c and vehicle identification information d are transmitted from the portable telephone 14 to the charging apparatus 18 using wide range communication (step S6).

The charge request information c and vehicle identification information d transmitted from the portable telephone 14 are received and decrypted by the receiving/decrypting section 46 in the charging apparatus 18 and then output to the authenticating section 48. The authenticating section 48 recognizes the vehicle on the basis of the decryption result. The vehicle recognition result is compared with the recognition information b output from the roadside apparatus 16 in step S2 (step S7). When the comparison result has no inconsistency (YES in step S8), the decryption result is output to the charge processing section 50.

If the comparison result has inconsistency (NO in step S8), charge processing using the toll charging system using the toll charging method according to this embodiment is not performed. Toll collection is done by directly paying the toll to a toll collector in a manned tollbooth, as usual.

The charge processing section 50 executes charge processing for the vehicle 10 on the basis of the decryption result output from the authenticating section 48 and outputs the charge processing result e to the charge processing result transmitting section 52 (step S9).

The charge processing result e is returned from the charge processing result transmitting section 52 to the vehicle 10 as the transmission source of the charge request information c and vehicle identification information d using wide range communication (step S10).

The charge processing result e transmitted from the charge processing result transmitting section 52 is received by the portable telephone 14 and output onto the display screen of the portable telephone 14 as character data and output from the speaker of the portable telephone 14 as voice data (step S11). With this operation, the passenger in the vehicle 10 is notified that the charge processing was correctly done.

To confirm the charge processing result e, it need not always be returned to the portable telephone 14. Instead, the passenger in the vehicle 10 may voluntarily access the charging apparatus 18 to confirm the charge processing result e. Alternatively, the charge processing result e received by the portable telephone 14 may be transferred to the onboard device 12 and displayed and output as voice data on the onboard device 12.

As described above, in the toll charging system using the toll charging method according to this embodiment, since the onboard device 12 which communicates with the roadside apparatus 16 is arranged, the charging apparatus 18 can measure the accurate position of the vehicle 10 and specify the vehicle model by the above function. Hence, a correct toll can be presented.

The communication between the onboard device 12 and the roadside apparatus 16 arranged on the roadside 15 is done only as downlink communication from the roadside apparatus 16 to the onboard device 12 side. In addition, the communication can be limited to short range communication. For this reason, the onboard device 12 need not have a wide range communication function and therefore can be inexpensive. Furthermore, the traffic amount in wide range communication can be reduced.

The roadside apparatus 16 and onboard device 12 may perform two-way communication and authenticate each other to ensure security.

The onboard device 12 can transmit the charge request information c received from the roadside apparatus 16 to the charging apparatus 18 by dialing the portable telephone 14. Since the driver need not make a call by himself using the portable telephone 14 during driving, driving safety is not impeded.

That is, wide range communication is done by the portable telephone 14, and short range communication is done by the onboard device 12. With this arrangement, the reliability of the entire system and the safety during driving can be improved while reducing the cost of the onboard device 12. As a result, proliferation of the toll charging system can be promoted.

(Second Embodiment)

Figure 11:
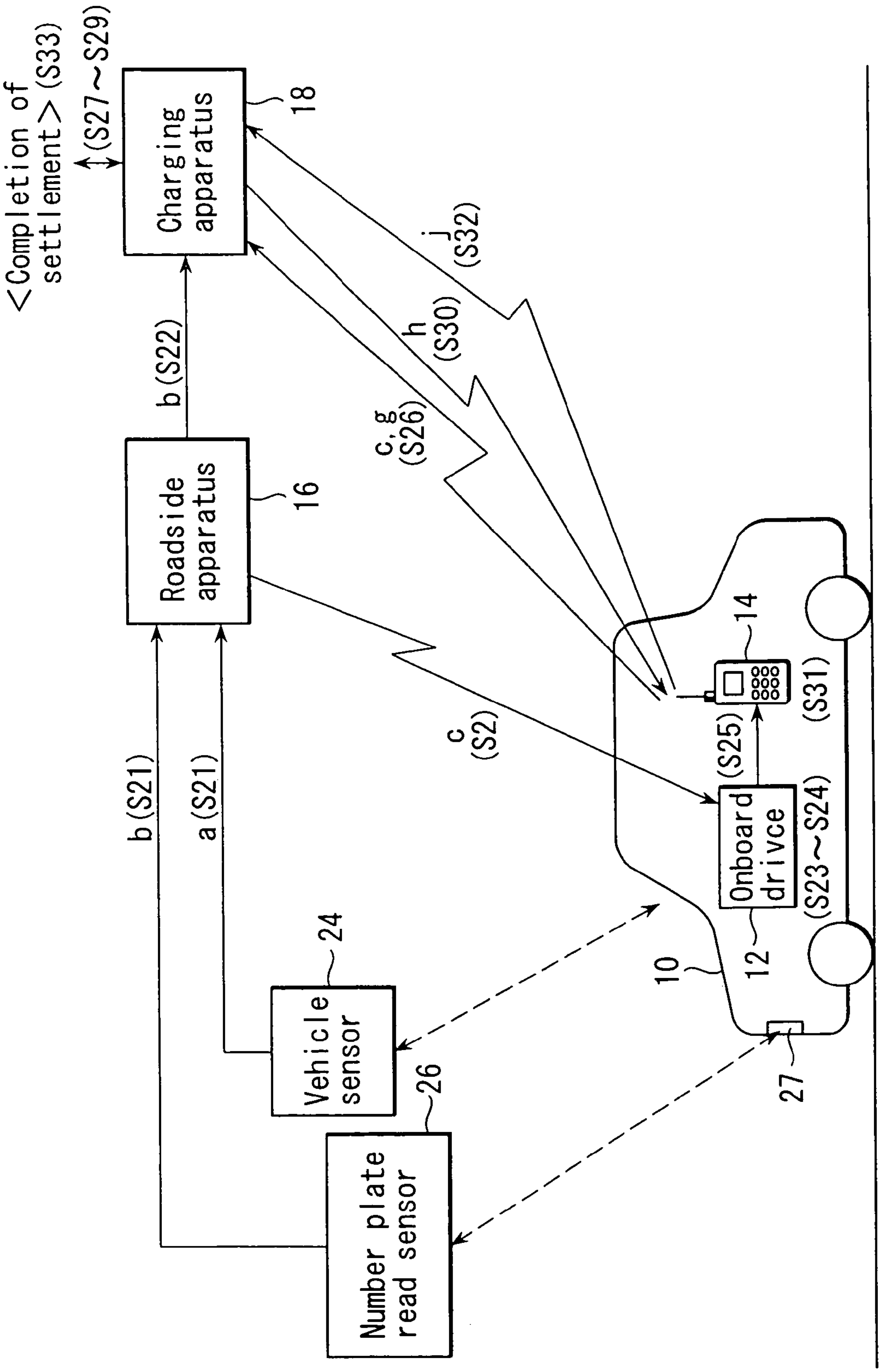
FIG. 11 is a view showing an example of a data flow so as to explain the operation of the toll charging system using the toll charging method according to the second embodiment.
Figure 12:
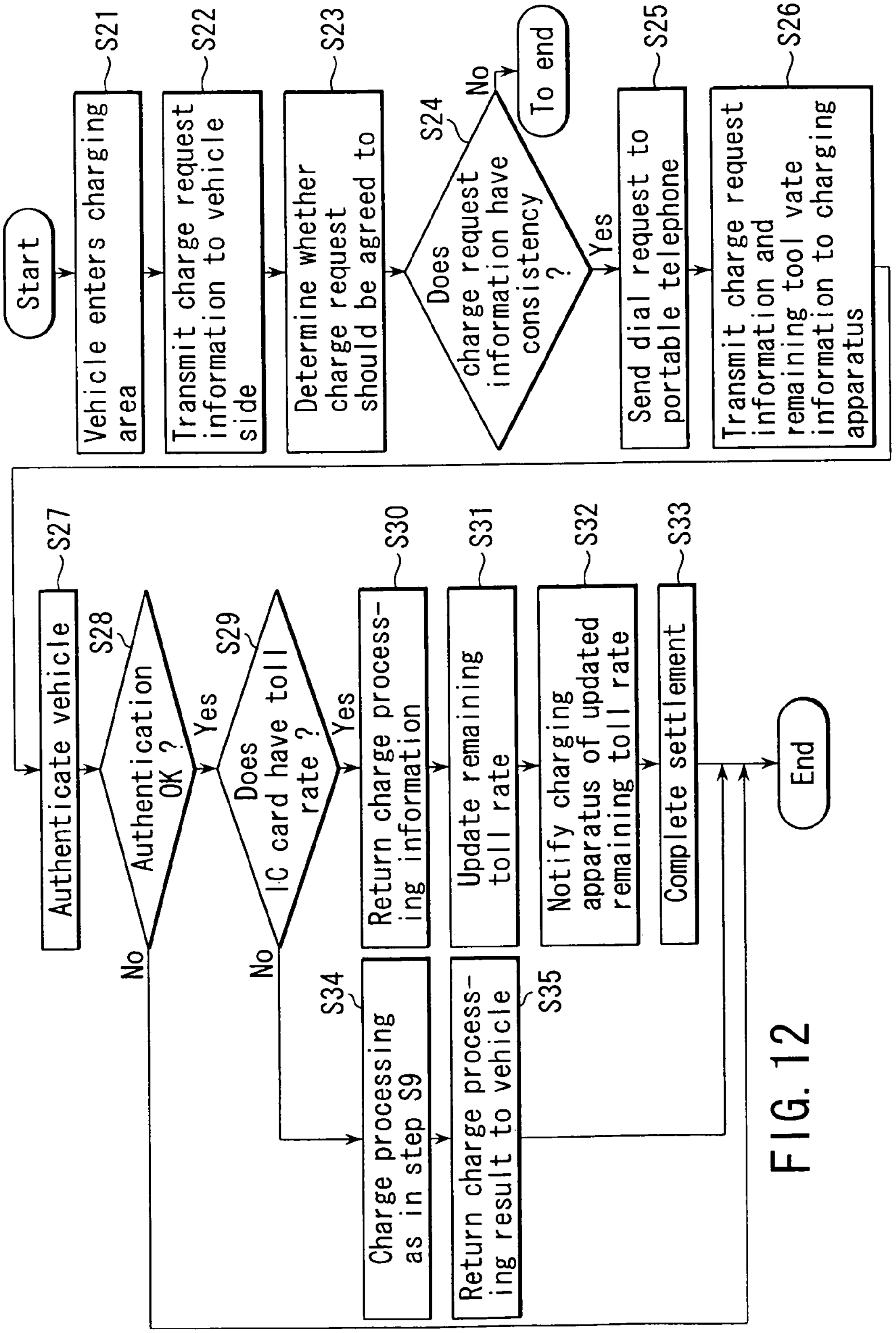
FIG. 12 is a flow chart showing an example of the operation of the toll charging system using the toll charging method according to the second embodiment.

The second embodiment of the present invention will be described with reference to FIGS. 10 to 12.

A toll charging system using a toll charging method according to the second embodiment of the present invention is different from the toll charging system using the toll charging method according to the first embodiment only in the arrangement of a portable telephone 14.

Hence, the different arrangement will be described here with reference to FIG. 10, and a repetitive description of the same parts will be omitted.

Figure 10:
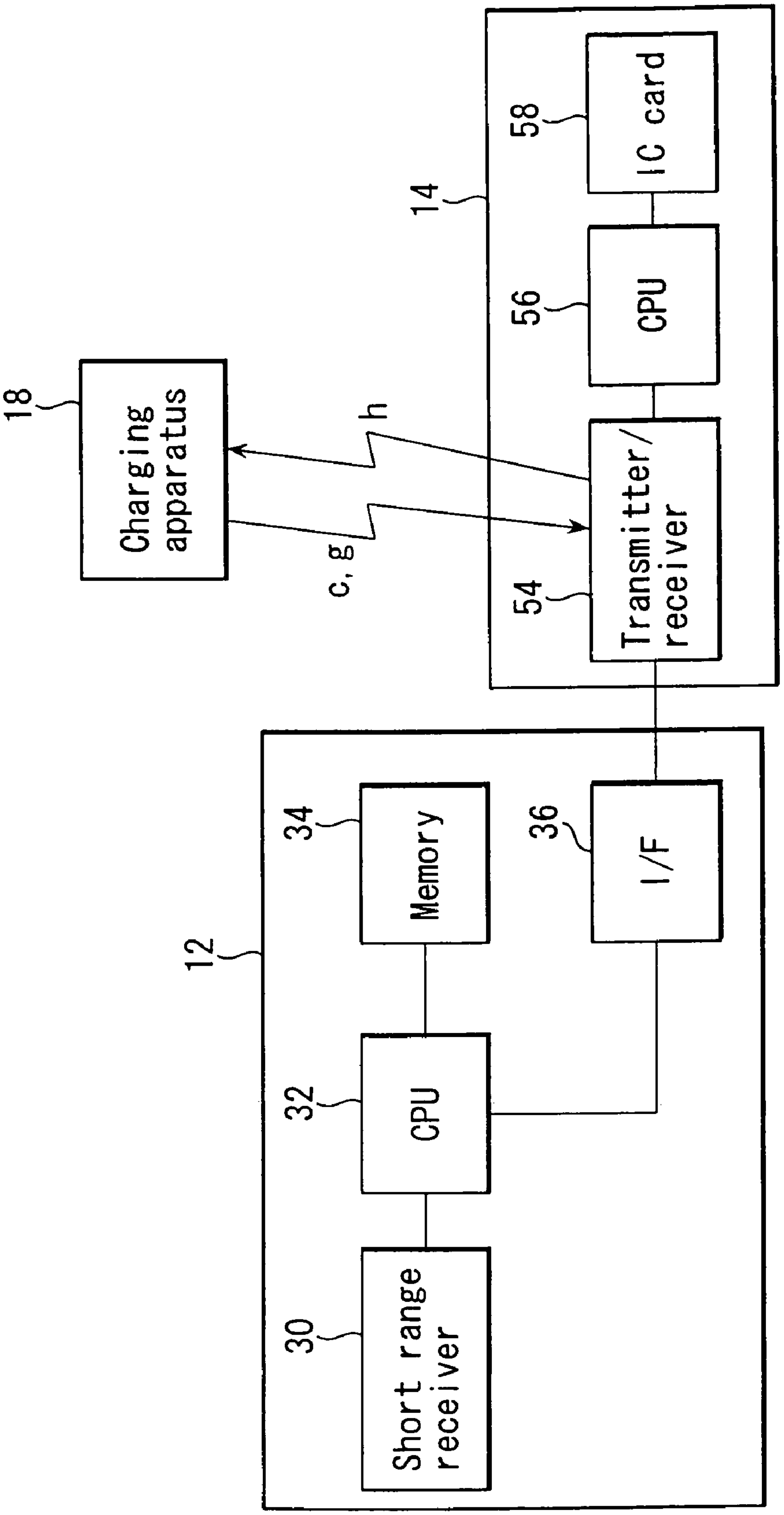
FIG. 10 is a functional block diagram showing an example of the arrangements of the onboard device and portable telephone, which are applied to a toll charging system using a toll charging method according to the second embodiment.

FIG. 10 is an example of a functional block diagram of an onboard device 12 and the portable telephone 14, which are applied to the toll charging system using the toll charging method according to this embodiment. The portable telephone 14 comprises a transmitter/receiver 54, CPU 56, and IC card 58.

The transmitter/receiver 54 executes normal voice communication and also transmits/receives data to/from the onboard device 12 and a charging apparatus 18. The transmitter/receiver 54 executes data transmission/reception in cooperation with the CPU 56. Upon receiving data from the onboard device 12, the transmitter/receiver 54 outputs the received data to the CPU 56. On the other hand, the transmitter/receiver 54 receives data from the CPU 56 and transmits the received data to the charging apparatus 18.

The CPU 56 writes data in the IC card 58 or reads data written in the IC card 58 on the basis of data received by the transmitter/receiver 54. When the transmitter/receiver 54 transmits data, the CPU 56 transfers necessary data to the transmitter/receiver 54.

The IC card 58 is a data-rewritable storage medium which can be attached/detached to/from the portable telephone 14. A toll rate corresponding to a toll of a toll road 22 is written in the IC card 58. When a toll is paid, settlement is done by subtracting a toll rate corresponding to the toll. A user can purchase the IC card 58 in which a toll rate corresponding to a toll is written at a predetermined facility such as a gas station or service area. In addition, a corresponding toll rate can also be additionally written by paying a corresponding charge at a predetermined facility.

Operation performed when a dial request is issued from an I/F 36 to the portable telephone 14 having the transmitter/receiver 54, CPU 56, and IC card 58 will be described with reference to the view of a data flow shown in FIG. 11 and the flow chart shown in FIG. 12. Steps S21 to S24 shown in FIGS. 11 and 12 are the same as steps S1 to S4 shown in FIGS. 8 and 9.

If charge request information c has no inconsistency (YES in step S24), a dial request is sent from an I/F 36 to the portable telephone 14. This dial request is received by the transmitter/receiver 54 (step S25).

When the transmitter/receiver 54 receives the dial request, the CPU 56 confirms the remaining toll rate of the IC card 58 and outputs the confirmation result to the transmitter/receiver 54. The transmitter/receiver 54 calls a charging apparatus 18 to transmit the charge request information c and remaining toll rate information g of the IC card 58 to the charging apparatus 18 using wide range communication (step S26).

The charge request information c and remaining toll rate information g transmitted by the portable telephone 14 is received by a receiving/decrypting section 46 of the charging apparatus 18, decrypted, and output to an authenticating section 48. The authenticating section 48 recognizes the vehicle on the basis of the decryption result. The vehicle recognition result is compared with recognition information b output from a roadside apparatus 16 in step S22 (step S27). If there is no inconsistency (YES in step S28), and a toll can be collected from the remaining toll rate of the IC card 58 (YES in step S29), charge processing information h is transmitted to the transmitter/receiver 54 of the portable telephone 14 as the transmission source to withdraw a toll rate corresponding to the toll (step S30).

If the comparison result in step S27 contains inconsistency (NO in step S28), charge processing using the toll charging system using the toll charging method according to this embodiment is not performed. Toll collection is done by directly paying the toll to a toll collector in a manned tollbooth, as usual.

If the comparison result in step S27 contains no inconsistency (YES in step S28), and the toll cannot be collected from the remaining toll rate of the IC card 58 (NO in step S29), charge processing for a vehicle 10 as the transmission source is done in the way described in step S9 of the first embodiment (step S34). As described in step S10 of the first embodiment, a charge processing result e is returned to the portable telephone 14 of the vehicle 10 as the transmission source using wide range communication (step S35).

The charge processing information h returned from the charging apparatus 18 in step S30 is received by the transmitter/receiver 54. The CPU 56 reduces the toll rate corresponding to the toll from the remaining toll rate of the IC card 58 on the basis of the charge processing information h and updates the remaining toll rate of the IC card 58 (step S31). In addition, the charging apparatus 18 is notified of the updated toll rate as withdrawal result information j by the transmitter/receiver 54 (step S32).

Upon receiving the withdrawal result information j transmitted from the transmitter/receiver 54, the charging apparatus 18 recognizes that the settlement is completed (step S33).

As described above, since the toll charging system using the toll charging method according to this embodiment has the above arrangement, the functions and effects obtained in the first embodiment can also be obtained using the IC card 58.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A toll charging system comprising:

a roadside apparatus;

an onboard device which is capable of being arranged in a vehicle;

a portable telephone; and a charging apparatus, wherein said roadside apparatus detects the vehicle entering a charging area and transmits charging information containing at least toll information and an address of the charging apparatus, wherein said onboard device receives the charging information transmitted from said roadside apparatus, generates vehicle identification information to identify the vehicle, and outputs, to said portable telephone, instruction information which instructs to transmit the charging information and vehicle identification information to the address contained in the received charging information, wherein said portable telephone transmits the charging information and vehicle identification information to the address on the basis of the instruction information output from said onboard device, wherein said charging apparatus receives the charging information and vehicle identification information transmitted from said portable telephone, identifies the vehicle on the basis of the received vehicle identification information, and executes charge processing for the identified vehicle, wherein said charging apparatus transmits a charge processing result to said portable telephone as the transmission source of the charging information and vehicle identification information, and said portable telephone receives the charge processing result transmitted from said charging apparatus and displays the charge processing result and outputs the charge processing result as voice data, and wherein said onboard device is used for communication in a shorter range than that of said portable telephone, thereby reducing an amount of communication traffic for said portable telephone.

2. A toll charging system using an onboard device and portable telephone, which are arranged in a vehicle, comprising:

a roadside apparatus;

a receiving apparatus;

a vehicle identification apparatus; and a charging apparatus, wherein said roadside apparatus detects the vehicle entering a charging area and transmits charging information containing at least toll information and an address of the charging apparatus to the detected vehicle, wherein said receiving apparatus receives vehicle identification information of the vehicle, which is generated by the onboard device upon receiving the charging information transmitted from said roadside apparatus, and the charging information transmitted from the portable telephone by the onboard device to the address, wherein said vehicle identification apparatus identifies the vehicle as a transmission source of the charging information and vehicle identification information on the basis of the vehicle identification information received by said receiving apparatus, wherein said charging apparatus executes charge processing for the vehicle identified by said vehicle identification apparatus on the basis of the charging information received by said receiving apparatus, wherein said charging apparatus transmits a charge processing result to said portable telephone as the transmission source of the charging information and vehicle identification information, and said portable telephone receives the charge processing result transmitted from said charging apparatus and displays the charge processing result and outputs the charge processing result as voice data, and wherein said onboard device is used for communication in a shorter range than that of said portable telephone, thereby reducing an amount of communication traffic for said portable telephone.

3. A toll charging system using an onboard device and portable telephone, which are arranged in a vehicle, a charging apparatus, and a roadside apparatus, wherein said onboard device comprises:

receiving means for receiving charging information transmitted from said roadside apparatus containing at least toll information and an address of said charging apparatus, and instruction means for outputting, to said portable telephone, instruction information which instructs to transmit the charging information together with vehicle identification information of the vehicle to the address contained in the charging information received by said receiving means, wherein said portable telephone transmits, on the basis of the instruction information output from said instruction means, the charging information together with the vehicle identification information to the address and receives a charge processing result processed by said charging apparatus on the basis of the transmitted charging information and returned from said charging apparatus, wherein said portable telephone displays the received charge processing result and outputs the charge processing result as voice data, and wherein said onboard device is used for communication in a shorter range than that of said portable telephone, thereby reducing an amount of communication traffic for said portable telephone.

4. A toll charging method comprising:

detecting a vehicle entering a charging area by a vehicle sensor and transmitting charging information containing at least toll information and an address of a charging apparatus from a roadside apparatus to the detected vehicle;

causing an onboard device arranged in the vehicle to receive the transmitted charging information;

outputting the charging information and vehicle identification information to identify the vehicle from the onboard device to a portable telephone communicable with the onboard device;

transmitting the charging information and the vehicle identification information output from the onboard device to the portable telephone from the portable telephone to the charging apparatus on the basis of the address; and causing the charging apparatus to identify the vehicle on the basis of the vehicle identification information and execute charge processing for the identified vehicle on the basis of the charging information, wherein said charging apparatus transmits a charge processing result to the portable telephone as a transmission source of the charging information and the vehicle identification information, and said portable telephone receives the charge processing result transmitted from the charging apparatus and displays the charge processing result and outputs the charge processing result as voice data, and wherein the onboard device is used for communication in a shorter range than that of the portable telephone, thereby reducing an amount of communication traffic for said portable telephone.

5. A toll charging method comprising:

detecting a vehicle entering a charging area by a vehicle sensor and transmitting charging information containing at least toll information and an address of a charging apparatus from a roadside apparatus to the detected vehicle;

causing an onboard device arranged in the vehicle to receive the transmitted charging information and generate vehicle identification information to identify the vehicle;

causing a portable telephone communicable with the onboard device to transmit, to the address, the charging information received by the onboard device and the vehicle identification information generated by the onboard device; and causing the charging apparatus to receive the charging information and the vehicle identification information transmitted from the portable telephone, identify the vehicle on the basis of the received vehicle identification information, and execute charge processing for the identified vehicle, wherein the charging apparatus transmits a charge processing result to the portable telephone as a transmission source of the charging information and the vehicle identification information, and the portable telephone receives the charge processing result transmitted from the charging apparatus and displays the charge processing result and outputs the charge processing result as voice data, and wherein the onboard device is used for communication in a shorter range than that of the portable telephone, thereby reducing an amount of communication traffic for said portable telephone.

6. A toll charging method comprising:

when a vehicle sensor detects a vehicle entering a charging area, causing an onboard device arranged in the vehicle to receive charging information transmitted from a roadside apparatus which transmits to the detected vehicle the charging information containing at least toll information and an address of a charging apparatus and causing the onboard device to generate vehicle identification information to identify the vehicle; and causing the onboard device to make a portable telephone communicable with the onboard device transmit the charging information and the vehicle identification information to the address to transmit the charging information and the vehicle identification information to the charging apparatus which identifies the vehicle on the basis of the vehicle identification information and executes charge processing for the identified vehicle, wherein the charging apparatus transmits a charge processing result to the portable telephone as a transmission source of the charging information and vehicle identification information, and the portable telephone receives the charge processing result transmitted from the charging apparatus and displays the charge processing result and outputs the charge processing result as voice data, and wherein the onboard device is used for communication in a shorter range than that of the portable telephone, thereby reducing an amount of communication traffic for said portable telephone.

7. A toll charging method using an onboard device and portable telephone, which are arranged in a vehicle, a charging apparatus, and a roadside apparatus comprising, causing the portable telephone to transmit charging information together with vehicle identification information output from the onboard device which receives the charging information transmitted from the roadside apparatus for transmitting the charging information containing at least toll information and an address of the charging apparatus when a vehicle sensor detects the vehicle entering a charging area, generates the vehicle identification information to identify the vehicle, and outputs the generated vehicle identification information together with the received charging information to the portable telephone, to the charging apparatus which identifies the vehicle on the basis of the vehicle identification information and executes charge processing for the identified vehicle on the basis of the charging information, wherein the charging apparatus transmits a charge processing result to the portable telephone as a transmission source of the charging information and vehicle identification information, and the portable telephone receives the charge processing result transmitted from the charging apparatus and displays the charge processing result and outputs the charge processing result as voice data, and wherein the onboard device is used for communication in a shorter range than that of the portable telephone, thereby reducing an amount of communication traffic for said portable telephone.

* * * * *